Dec. 27, 1955  F. G. CARPENTER  2,728,181
ENDLESS BELT TYPE LAWN MOWER
Filed Sept. 20, 1954  3 Sheets-Sheet 1
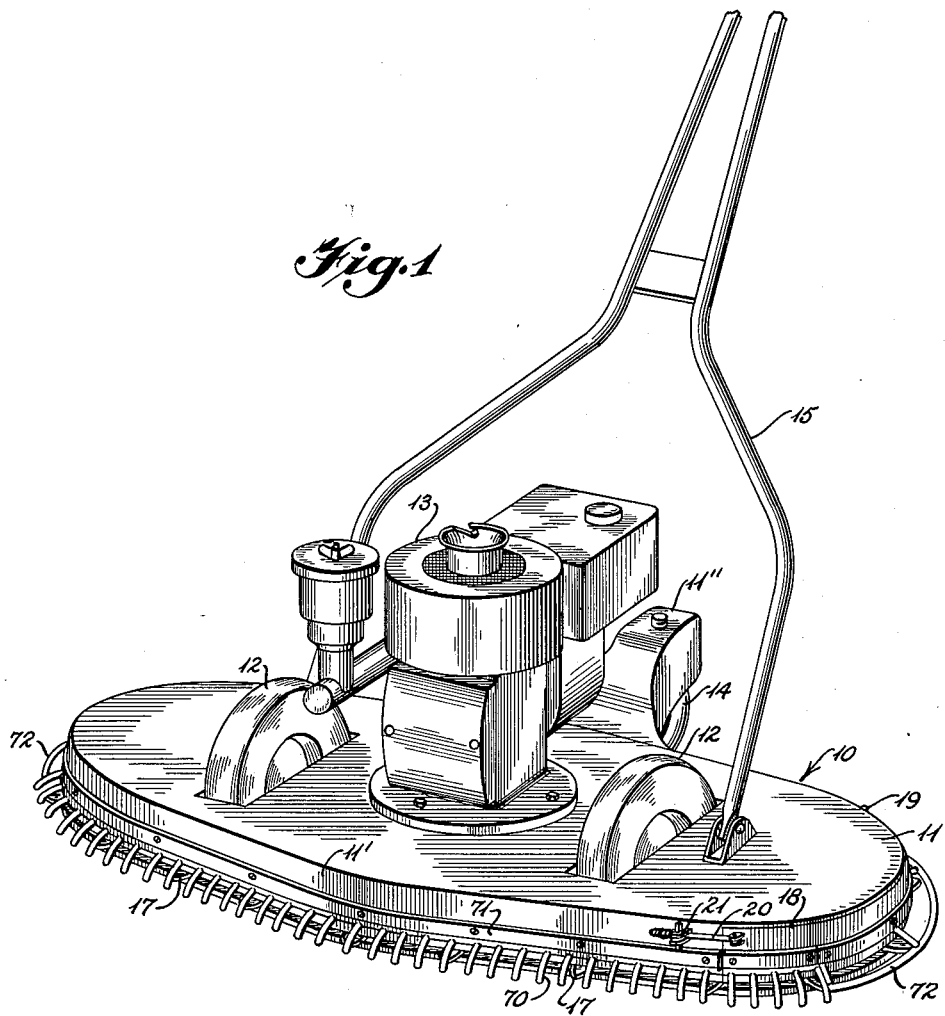
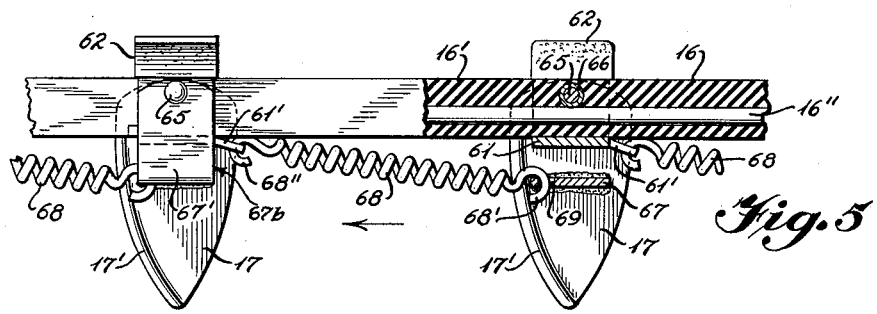
INVENTOR
*Frank G. Carpenter*
BY *Beale & Jones*
ATTORNEYS Dec. 27, 1955

F. G. CARPENTER 2,728,181

ENDLESS BELT TYPE LAWN MOWER

Filed Sept. 20, 1954

INVENTOR
*Frank G. Carpenter*

BY *Beale and Jones*

ATTORNEYS

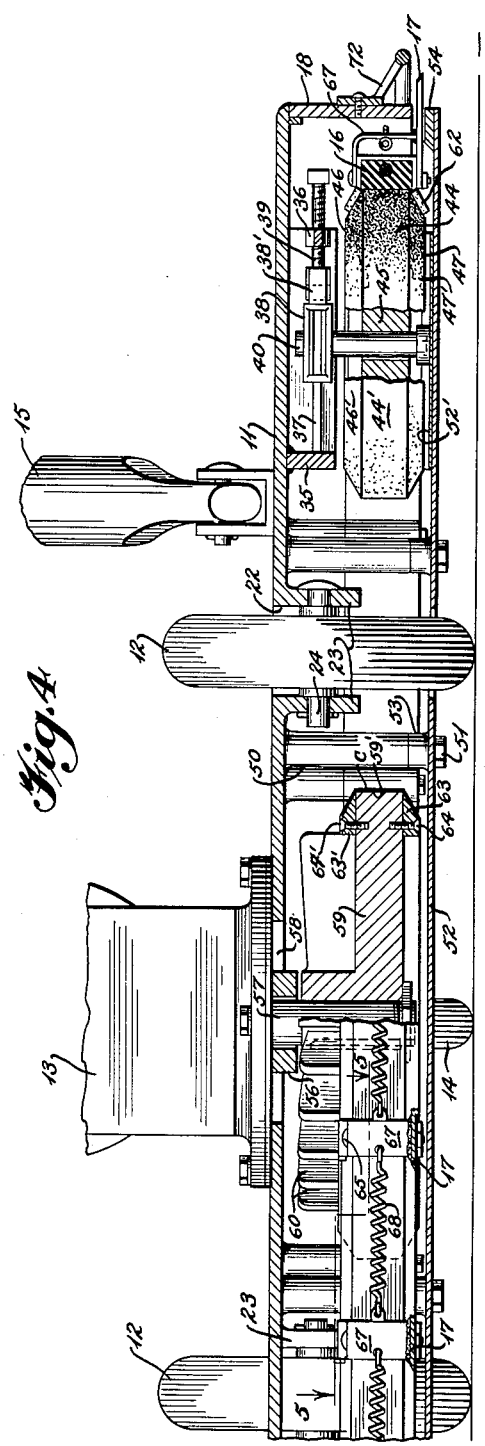

United States Patent Office 2,728,181
Patented Dec. 27, 1955

2,728,181

ENDLESS BELT TYPE LAWN MOWER

Frank G. Carpenter, Tampa, Fla.

Application September 20, 1954, Serial No. 457,063

12 Claims. (Cl. 56—25)

My invention is directed to improvements in an endless belt type of power lawn mower.

An object of my invention is to provide a lawn mower of the endless belt type which will cut a relatively wide swath yet is supported for rolling engagement with the ground that permits cutting up close to buildings, trees, and shrubbery.

A further object of my invention is to provide a belt type of mower which is of elongated elliptical shape having guide pulleys at each end of the mower and a motor driven drive pulley intermediate the guide pulleys for driving the endless belt trained over the pulleys.

A still further object of my invention is to provide an endless belt for a rotor type of lawn mower wherein cutter blades are mounted on the belt without decreasing the strength and safety of the belt.

A still further object of the invention is to provide an endless belt for a power lawn mower that has mounted thereon pivotal cutter blades that are biased by tension springs in the direction of rotation so as to pivotally yield on striking obstacles without injury to the blade or belt and which afford a component of force acting oppositely to the centrifugal force existing on rotation of the belt carrying the attached blades which acts to pull the belt into contact with its pulleys and wherein the springs relieve the belt of a large part of the cutting torque on the blades.

Another object of my invention is to provide an endless cutter blade carrying belt for a power lawn mower wherein the blades are mounted on the belt in a pivotal manner by bracket means that balance the outwardly projecting blades yet provide a pivotal blade mounting at a point proximal to the inside vertical drive face of the belt.

A still further object of my invention is to provide an endless blade carrying belt for a power lawn mower that has a longitudinal reinforcing member embedded therein that extends throughout the length of the belt.

A further object of my invention is to provide, in an endless belt type of power lawn mower, guide and drive pulleys for the endless belt that not only have vertical drive faces but also side faces adjacent the vertical face for driving the belt and wherein the belt has a combined mounting bracket for the blades and drive legs associated with the bracket which protrude inward beyond the vertical drive face of the belt and ride against the said side faces of the pulleys adjacent the vertical face of each pulley for driving engagement therewith.

Still further objects and the entire scope of applicability of the present invention will become apparent from the detailed description given hereinafter; it should be understood, however, that the detailed description and specific example is given by way of illustration only and, while indicating preferred embodiment of the invention, is not given by way of limitation, since various changes and modifications within the spirit and scope of the invention will become apparent to those skilled in the art from this detailed description.

For a more complete understanding of the nature and scope of my invention reference can be had to the following detailed description taken in connection with the accompanying drawings in which:

Fig. 1 is a perspective view of the lawn mower according to my invention;

Fig. 4 is an enlarged vertical transverse cross section along line 4—4 of Fig. 2;

Fig. 5 is an enlarged top plan view of the belt along line 5—5 of Fig. 4;

Fig. 6 is an enlarged vertical transverse sectional view along line 6—6 of Fig. 2 showing the belt supported on a guide track and, Fig. 7 is an enlarged sectional view along line 7—7 of Fig. 2 showing the securing means for the detachable end skirt of the frame of the mower.

Throughout the various figures of the drawings and the description like reference numerals refer to similar parts.

Figure 2:
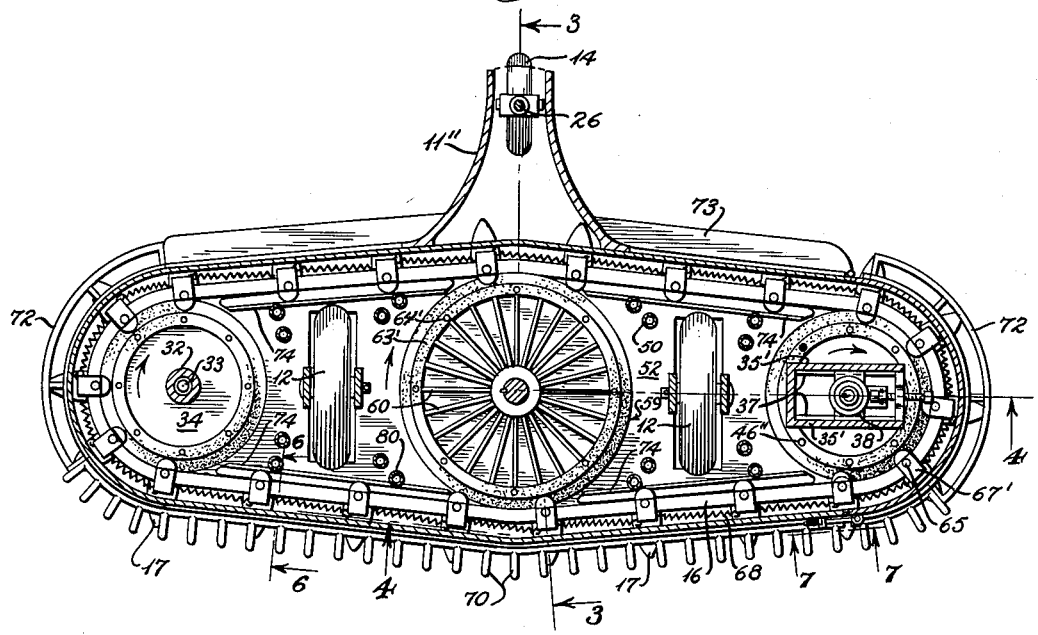
Fig. 2 is a plan view of the mower shown in Fig. 1 with the motor and top housing broken away and shown in section.

In Fig. 1 of my power lawn mower, as generally indicated at 10, and comprises an elongated elliptically shaped frame 11 having ground-engaging wheels 12—12, a motor 13 mounted on top of the frame 11, a rear vertically adjustable caster wheel 14, a handle 15, an endless power driven belt 16, best shown in Fig. 2, which carries pivotally mounted cutter blades 17.

The elongated elliptically shaped frame 11 extends in a horizontal direction and transverse to the direction of movement of the mower.

Frame 11 is formed with a downwardly depending skirt 11' which is open at the righthand end, see Fig. 1, and has mounted over the opening an arcuate shaped door 18 pivoted at 19 and held closed by a spring pressed latch 20 detachably secured in lugs 21 extending laterally outward from the skirt 11'. Frame 11 is formed with spaced apart rectangular shaped wheel receiving apertures 22, see Fig. 4, which apertures have downwardly extending depending lugs 23 adjacent thereto which receive suitable axle pins 24 that support the wheels 12. Attached to the rear and central portion of the frame 11 is a caster wheel housing 11'' that has a vertically extending threaded aperture 25 at its rearmost portion which receives a threaded stud 26. The stud 26 is threadedly adjusted in the aperture 25 and locked therein by the set-screw 27 and locknut 28 received over the threaded stud 26. Threaded stud 26 has pivotally attached at its bottom end 26' a bifurcated fork 29 which carries a transverse axle pin 30 that mounts the caster wheel 14. Thus, the bifurcated fork support 29 for the caster wheel 14 is free to pivot about the head 26' of the vertically disposed threaded stud 26, and by applying pressure on the handle 15, see Fig. 1, the mower is maneuvered in a directional manner. At the lefthand end of the frame 11, see Fig. 2, there is attached as by welding or molding, a depending apertured lug 32 which is internally threaded to receive a pivot bolt 33 on which is mounted a guide pulley 34 for the endless belt 16. Attached to the underneath side of the righthand end of frame 11 is a box-like framework 35, see Fig. 4, that is open at its righthand end to receive a mounting plate 36 which has a horizontally extending threaded aperture therein. In the side members 35'—35' of box 35, are formed oppositely disposed longitudinal tongues 37—37 which receive a slide member 38 that has a laterally extending lug 38' in which is housed a pivotal end fitting of a screw 39 which is received in the threaded aperture of the endplate 36. Thus by rotating threaded screw 39, slide member 38 may be adjusted to the right or left for purposes of tightening the belt as will be hereinafter explained.

Mounted in the slide member 38, see Fig. 4, is a vertically extending pivotal screw 40 that supports the right-hand guide pulley 44 for endless belt 16.

Each of the guide pulleys 34 and 44 are alike. Pulley 44, for example, has a central horizontally disposed core 45 with a vertical peripheral face 44' over which belt 16 is trained. Pulley 44 is also made up with a top plate 46 having a beveled outer surface 46' adjacent to the vertical face 44' of core 45 that is attached thereto as by screws 46", see Fig. 2. A similar bottom plate 47 having a beveled face 47' is attached to the bottom of the core 44.

The frame 11 has attached thereto spaced apart depending studs 50 that are formed with internal threaded apertures at their bottom ends to receive securing cap screws 51. A bottom plate 52 closes off the bottom of the mower and it is formed with upstanding apertured lugs 53 on the top side thereof that are in alignment with the studs 50 and receive the securing cap screws 51 which hold the bottom plate in place.

Figure 3:
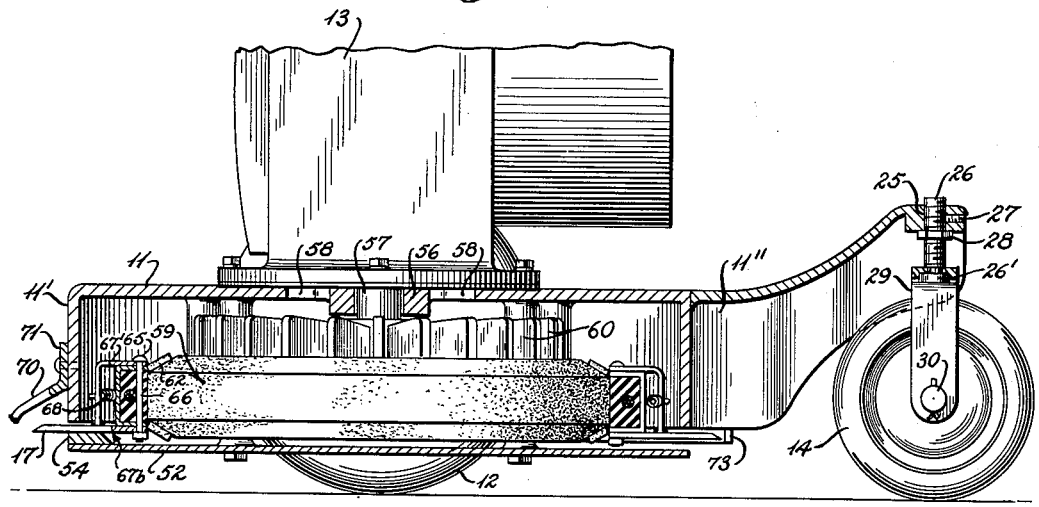
Fig. 3 is an enlarged vertical transverse cross sectional view along line 3—3 of Fig. 2.

It will be noted in Fig. 4 that below pulley 44, a reinforcing plate 52' is attached to the top of plate 52 and abutts the end of pivot screw or spindle 40 that mounts pulley 44. In Figures 3, 4, and 6 there is shown a flat guard bar 54 attached to the front and ends of bottom plate 52 in spaced position below the cutter blades 17 which project outward from the frame 11 and its vertically depending skirt 11'.

Referring to Figures 3 and 4 the frame 11 is formed at its center with a depending apertured boss 56 through which vertically downward there extends the drive shaft 57 of motor 13. Surrounding the boss 56 in a circular pattern are air vent apertures 58 in frame 11 which communicate with air passageways extending vertically through the motor 13. Drive shaft 57 has keyed thereto a drive pulley 59 that has formed thereon on its top face radially and vertically extending fan blades 60 which force air upwardly through the vents 58 as well as outwardly in a radial direction from the fan.

Drive pulley 59 is larger than the guide pulleys 34 and 44 and it drives the endless belt 16 carrying the cutter blades 17. Drive pulley 59, see Figures 2, 3, and 4 has a top annular plate 63' that is secured to the pulley 59 by screws 64'. A similar bottom annular and beveled plate 63 is secured to the bottom of pulley 59 by screws 64. The beveled faces of top and bottom annular plates 63' and 63 are adjacent the vertical peripheral face 59' of pulley 59. The beveled faces on plates 63' and 63 and the vertical face 59' of drive pulley 59 have a non-slip coating C adhered thereto as shown in Fig. 4. This coating C may have minute hard particles embedded therein which will assist in driving the belt 16 in contact with vertical face 59' of pulley 59 and the extending legs 62 of the U-shaped cutter blade mounting plates 61 attached to the belt 16 as by vertically extending pivot pins 65. These U-shaped cutter blade mounting plates 61 encircle top, bottom, and outer vertical faces of the generally rectangular in vertical cross section belt 16.

Belt 16 of general rectangular vertical cross sectional shape has vertically extending sleeves 66 embedded therein in spaced relation in from the inner vertical face 16' to receive the pivot pins 65.

The cutter blades 17 are generally triangular in shape and have a beveled cutter edge 17' on their leading edge as shown in Fig. 5. The cutter blades are apertured at 17" at their base end and are mounted adjacent the lower leg 62 of the U-shaped plate 61 over pivot pin 65 where they are secured by nuts 65'. A reinforcing right angle support bracket 67 having a leg 67' which is pivotally received over the top end of pivot pin 65 is secured at its bottom end 67" to the blade 17 as by welding. In effect the reinforced bracket 67 forms with the base portion of the blade 17 a U-shaped mounting bracket, generally indicated at 67b, for the blade 17.

The cutter blades 17 are biased in the direction of rotation by tension springs 68 which have their rear ends 68' hooked into an aperture formed in the vertical leg of the reinforcing bracket 67, as at 69, while their forward ends 68" are hooked into a lug 61' formed on the next forwardly spaced bracket 61 attached to the belt 16. These tension springs 68 permit the cutter blades 16 to pivot backward on striking obstacles. The springs 68 also act against the centrifugal force in the rotating blades to hold them inwardly and to take up the greater amount of the cutting torque in the blades so as to relieve the belt 16 of strain. So also the tension springs 68 tend to hold the belt 16 and the U-shaped plates 61 attached thereto in against the pulleys and in particular the projecting legs 62—62 of the plates 61 against the coated top and bottom beveled faces 63' and 63 of the drive pulley 59 and the inner vertical face 16' of the belt 16 in driving engagement with the coated drive face 59' on the pulley 59.

The depending vertical skirt 11' on the frame 11 extends downwardly to where it is in spaced relation above the horizontally extending cutter blades 17 as best shown in Fig. 6. The skirt 11' also projects downwardly in spaced relation outside of the belt 16 and the plates 61 and the brackets 67b so as to provide a guard. In addition to the guard skirt 11' of the frame, I provide guard fingers 70 which are spaced apart and extend outwardly and downwardly over the cutter blades 17 from a strap member 71 which is secured to the skirt 11' along its forward portion. At the ends of the frame 11 and over the cutter blades 17, there is additionally provided guard rail sections 72—72. At the rear of frame 11 and attached to vertical skirt 11' is a guard plate 73 which projects rearwardly and downwardly over the cutter blades as shown in Figures 2 and 3.

The fan blades 60 on the top of pulley 59 besides forcing air upwardly through the vent apertures 58 also force air and cut material rearwardly of the frame 11 and under the rear guard plate 73.

In Fig. 2 I have shown four belt supporting tracks 74 which are positioned in pairs intermediate the drive pulley 59 and each end guide pulley 34 and 44. In Fig. 6 the guide tracks 74 are shown having a vertical face 75 over which the vertical drive face 16' of the belt 16 slides while beveled top and bottom faces 76 and 77 form a slide surface for the inwardly extending legs 62—62 of the U-shaped plates 61 on the belt 16. The tracks 74 have vertically extending aperture lugs 78 attached to their rear surface which are secured by screws 79 to depending lugs 80 on frame 11.

I have provided a power lawn mower of the endless belt type which will cut very close to buildings, trees, and shrubbery. The mower has a unique cutter blade mounting on an endless belt which is rugged in construction yet is highly flexible. The belt 16 may be made of laminated natural or synthetic rubber, the latter of which is particularly tough and has long wearing qualities. The embedded flexible wire cable 16" provides a non-stretchable reinforcement throughout the whole longitudinal extent of the belt. The tension springs 68 serve a multiple purpose of insuring strain relief for the belt proper, holding the belt and its attached brackets in tight engagement with the pulleys, particularly the drive pulley 59, and afford force counter to the centrifugal force set up in the blades yet permit the blades to pivot on striking obstacles.

The lawn mower according to this construction is of relatively light weight, easily maneuvered and still of rugged construction.

I claim as my invention:

1. A lawn mower comprising, in combination, a horizontally disposed frame of elongated shape extending transverse to the general direction of travel, said frame having a pair of spaced apart wheel supports disposed respectively in spaced relation from either end of the elongated frame, ground engaging wheels mounted on said wheel supports, a ground engaging wheel support attached to the rear of said frame and a ground engaging wheel mounted on said latter wheel support, a horizontally disposed guide pulley pivotally attached beneath and at each elongated end of said frame, motor means mounted on said frame at the center thereof and having a vertically disposed drive shaft attached thereto and extending downwardly below said frame, a horizontally disposed drive pulley fixed to said shaft and lying in planar alignment with said guide pulleys, handle means attached to said frame, an endless belt having a pulley engaging face positioned over said pulleys and driven by said drive pulley, said belt being reinforced lengthwise thereof and having a plurality of spaced apart mounting plates fixed thereto so as to leave the pulley engaging face of the belt free for engagement with said pulleys, a U-shaped cutter blade mounting bracket extending over the mounting plates and opposite to said pulley engaging face of the belt and pivotally attached to the plates and to said belt and having a horizontal cutter blade attached thereto extending outward from said belt and said frame and biasing means attached at one end to each U-shaped cutter blade mounting bracket and extending in the direction of rotation of said belt to where its other end is attached to the next spaced mounting plate.

2. A lawn mower comprising, in combination, a horizontally disposed frame of elongated shape extending transverse to the general direction of travel of the mower, said frame having ground engaging wheels attached underneath said frame and a ground engaging support attached to the rear of said frame, a handle attached to the frame, a horizontally disposed guide pulley pivotally attached beneath and at each elongated end of said frame, motor means mounted on said frame and having a vertically disposed drive shaft driven thereby disposed intermediate said guide pulleys, a horizontally disposed drive pulley fixed to said shaft and lying in planar alignment with the guide pulleys, and an endless belt having a pulley engaging face positioned over said pulleys and driven by said drive pulley, said belt having a plurality of spaced apart mounting plates fixed thereto so as to leave the pulley engaging face of the belt free for engagement with said pulleys, a U-shaped cutter blade mounting bracket extending over the mounting plates and opposite to said pulley engaging face of the belt and pivotally attached to the plates and said belt and having a horizontal cutter blade attached thereto extending outward from said belt and said frame and biasing means attached at one end to each blade and extending in the direction of rotation of said belt to where its other end is attached to the next spaced mounting plate.

3. A lawn mower comprising, in combination, a horizontally disposed frame of elongated shape extending transverse in the general direction of travel of the mower, said frame having ground engaging wheels attached underneath said frame and a ground engaging support attached to the rear of said frame, a handle attached to said frame, a horizontally disposed guide pulley pivotally attached beneath and at each elongated end of said frame, each guide pulley having a vertically extending peripheral face and a top and bottom portion adjacent thereto, motor means mounted on said frame and having a vertically disposed drive shaft driven thereby disposed intermediate said guide pulleys, a horizontally disposed drive pulley fixed to said shaft and lying in planar alignment with the guide pulleys, and an endless belt having a pulley engaging face positioned over said pulleys and driven by said drive pulley, said belt having a plurality of spaced apart U-shaped mounting plates attached thereto with the legs thereof extending over the top and bottom of the belt and beyond the pulley engaging face where the ends of said legs overlie the top and bottom portions of the pulley adjacent the peripheral face, a U-shaped cutter blade mounting bracket pivotally attached to each U-shaped mounting plate and the belt and having the legs thereof extending over the U-shaped mounting plates and outward therefrom opposite to said pulley engaging face of the belt, and a horizontally disposed cutter blade fixed to each U-shaped blade mounting bracket and extending outward from said belt and frame and biasing means attached at one end thereof to each U-shaped cutter blade mounting bracket and extending in the direction of rotation of said belt to where its other end is attached to the next spaced mounting plate.

4. A lawn mower of the character described in claim 3 wherein said drive pulley has its belt engaging face and the top and bottom portions thereof adjacent said face covered with a slip resistance facing for drive engagement with said belt and the projecting legs of the U-shaped mounting plates.

5. A lawn mower of the character described in claim 3 including guide tracks for said endless belt disposed intermediate said drive pulley and said guide pulleys.

6. A lawn mower of the character described in claim 4 wherein the top and bottom portions of the pulleys adjacent the belt engaging face thereof are beveled with an increasing thickness of the pulley from the face of the pulley radially inward and the portions of said legs of the U-shaped cutter blade mounting brackets extend angularly so as to lie adjacent said beveled portions of the pulleys.

7. A lawn mower comprising, in combination, a horizontally disposed frame of elongated shape extending transverse to the general direction of travel of the mower, said frame having a pair of spaced apart wheel supports disposed respectively in spaced relation from either end of the elongated frame, ground engaging wheels mounted on said wheel supports, a ground engaging rear wheel support attached to the frame and extending rearwardly from the center thereof, a caster wheel mounted in said rear wheel support, a handle attached to said frame, a horizontally disposed guide pulley pivotally attached beneath and at each elongated end of said frame, motor means mounted on said frame and having a vertically disposed drive shaft driven thereby disposed intermediate said guide pulleys, said motor means having air passageways extending therethrough, a horizontally disposed drive pulley of a larger diameter than said guide pulleys fixed to said shaft and lying in planar alignment with the guide pulleys, said drive pulley having upwardly and radially extending fan blade elements attached to the top face thereof, said frame having air vent apertures extending therethrough for communication with said air passageways in said motor means and said fan blade elements, and an endless belt having a pulley engaging face positioned over said pulleys and driven by said drive pulley, belt tracks attached to said frame intermediate said drive pulley and the guide pulleys, said belt having a plurality of spaced apart horizontally extending cutter blades pivotally attached thereto for pivotal movement about a vertical axis and extending outwardly from said belt and beyond said frame, said frame having guard means extending laterally therefrom and positioned in spaced relation above said projecting cutter blade elements.

8. A lawn mower of the character described in claim 7 wherein one of said guide pulleys is mounted on said frame for lateral positioning thereof in the elongated direction of said frame.

9. A lawn mower of the character described in claim 7 wherein said endless belt is of rectangular cross sectional shape and has a reinforcing core embedded therein and extending throughout its length, said belt having a plurality of spaced apart U-shaped mounting plates attached thereto with the legs thereof extending over the top and bottom of the belt and beyond the pulley engaging face where the ends of said legs overlie the top and bottom portions of the pulley adjacent the pulley face, a U-shaped cutter blade mounting bracket pivotally attached by a vertical pivot pin to each U-shaped mounting plate and the belt and having the legs thereof extending over the U-shaped mounting plates and outward therefrom opposite to said pulley engaging face of the belt, and a horizontally disposed cutter blade fixed to each U-shaped blade mounting bracket and extending outward from said belt and frame and tension springs attached at one end thereof to each blade and extending in the direction of rotation of said belt to where the other end of the spring is attached to the next spaced mounting plate.

10. An endless cutter blade carrying belt for a power lawn mower for support and driving engagement with a pair of spaced apart pulleys disposed in a horizontal plane, each pulley having a vertically disposed peripheral face and a top and bottom portion adjacent thereto, comprising an endless flexible belt having a generally rectangular cross sectional shape and a vertical face for engagement with the peripheral face of said pulleys, a plurality of spaced apart U-shaped mounting plates attached to said belt with the legs thereof extending over the top and bottom of the belt and beyond the pulley engaging face where the ends of said legs overlie the top and bottom portion of the pulley adjacent the peripheral face of the pulley, a U-shaped cutter blade mounting bracket pivotally attached by a vertical pivot pin to each U-shaped mounting plate and the belt and having the legs thereof extending over the U-shaped mounting plates and outward therefrom opposite to said pulley engaging face of the belt, and a horizontally disposed cutter blade fixed to each U-shaped blade mounting bracket adjacent the bottom thereof and extending outwardly from said belt.

11. An endless cutter blade carrying belt for a power lawn mower for support and driving engagement with a pair of spaced apart pulleys disposed in a horizontal plane, each pulley having a vertically disposed peripheral face and a top and bottom portion adjacent thereto, comprising an endless flexible belt having a generally rectangular cross sectional shape with a vertical inner side edge thereof for engagement with the peripheral face of said pulleys, a flexible wire reinforcing core embedded in said belt and extending throughout its length, a plurality of spaced apart U-shaped mounting plates attached to said belt with the legs thereof extending over the top and bottom of the belt and beyond the pulley engaging face where the ends of said legs overlie the top and bottom portion of the pulley adjacent the peripheral face thereof, a U-shaped cutter blade mounting bracket pivotally attached by a vertical pin in each U-shaped mounting plate and the belt and having the legs thereof extending over the U-shaped mounting plates and outward therefrom opposite to said pulley engaging face of the belt, and a horizontally disposed cutter blade fixed to each U-shaped blade mounting bracket adjacent the bottom thereof and extending outward from said belt, and tension springs attached at one end thereof to each blade towards the outer end thereof and at the other end to the next adjacently spaced U-shaped mounting plate on said belt.

12. A lawn mower comprising, in combination, a horizontally disposed frame of elongated shape extending transverse to the general direction of travel of the mower, said frame having ground engaging wheels attached underneath said frame, a handle attached to the frame, a horizontally disposed guide pulley pivotally attached beneath and at each elongated end of said frame, motor means mounted on said frame and having a vertically disposed drive shaft driven thereby disposed intermediate said guide pulleys, a horizontally disposed drive pulley fixed to said shaft and lying in planar alignment with the guide pulleys, and an endless belt having a pulley engaging face positioned over said pulleys and driven by said drive pulley, said belt having a plurality of spaced apart mounting plates fixed thereto so as to leave the pulley engaging face of the belt free for engagement with said pulleys, a U-shaped cutter blade mounting bracket extending over the mounting plates and opposite to said pulley engaging face of the belt and pivotally attached to the plates and said belt and having a horizontal cutter blade attached thereto extending outward from said belt and said frame and biasing means attached at one end to each blade and extending in the direction of rotation of said belt to where its other end is attached to the next spaced mounting plate.

No references cited.